Patented May 15, 1951

2,553,533

UNITED STATES PATENT OFFICE 2,553,533

CURING PROCESS FOR BACON

Stephan L. Komarik and Lloyd A. Hall, Chicago, Ill., assignors to The Griffith Laboratories, Inc., Chicago, Ill., a corporation of Illinois No Drawing. Application June 17, 1950, Serial No. 168,848

17 Claims. (Cl. 99—159)

The present invention relates to curing bacon and like animal products having both lean and fat as characteristic constituents thereof. In particular, it relates to a short-time process to effect the desired curing for stability and uniformity of coloring and flavor, and it includes a preliminary conditioning step related to the conditions imposed in the short time cure.

Heretofore, pork bellies and such products have been cured by dry salting methods. Generally, such methods involve the rubbing of dry curing salt onto the pork bellies or other forms, and the storage of such salt-rubbed products at a temperature around 40° F. for a period of 6 to 15 days varying with the size of the product. The cold-cured pieces are then smoked, at a temperature necessarily controlled to effect a desired stable red color in the lean. The cold temperature for such curing minimizes spoilage, and particularly oxidation, which is reflected in the color of lean and in rancidity of fat. One defect of such prior art method is the variability of the result. The sizes and shapes of the meat forms so treated and the variance in concentration of salt thereon, all result in non-uniformity of cure, and hence variability in color, taste, and stability within a single piece.

The present invention aims to overcome the defects of such prior art curing methods, by using conditions leading to uniformity of action and result as reflected in improved appearance, taste and stability.

It is a general object of the invention to employ a uniform concentration of curing salt, in the form of liquid brine, in contact with substantially the entire surface of the meat body, in the step of effecting the salt cure.

It is another object of the invention to effect the salt cure at an elevated temperature well above the usual cold temperatures and thereby to effect the process in a matter of hours compared to days, as in the prior art, and also to bring about the desired red color in advance of smoking.

It is another object of the invention to precede the above-mentioned warm brine curing step with a conditioning step to minimize the oxidation effects which tend to occur at the more elevated curing temperature, and at the same time to introduce any other treating or flavoring agent as may be desired.

It is also an object of the invention to effect the usual smoking treatment on the salt-cured product, and to do so without the temperature control heretofore considered necessary following the cold salting cure of the prior art.

Various other and ancillary objects and advantages of the invention will become apparent from the following description and explanation of the invention.

Pork bellies contain a large amount of fat, as well as protein strips of lean, which lean contains enzymes, bacteria and oxygen-bearing pigments including myoglobin and hemoglobin. These pigments are complex compounds of protein and organic iron, and they function in the formation of desirable color characterizing the lean part of preferred commercial bacon. These pigmentary constituents are easily oxidized by oxygen of the air and by other agents, and they are also capable of releasing oxygen. Such oxidation and reduction reactions vary the color of the lean portion of the bacon, and the changes reflect instability of the product. One objective in a curing process, in addition to effecting a desirable flavor, is to form and fix the desired attractive red color in the lean.

It is also well known that the fat of bacon contains enzymes which function on the fatty compounds thereof and develop rancidity and other undesirable off-flavors. These reactions progress slowly over long periods of time and to the extent which they have taken place they make the bacon less palatable or even unpalatable. This again characterizes such a product as unstable, and since the changes may be readily localized, the product is non-uniform.

It is an undesired result in the present invention wherein curing with salt brine is effected rapidly and at an elevated temperature, that the activation of the enzymes and the chemical reactions in both the lean and the fat involving oxidation, are accelerated and normally would lead to rapid development of rancidity and off-flavor. In mitigation, however, it is a characteristic of the present invention that before the warm curing step takes place, the product to be so cured is conditioned to minimize such undesirable results, particularly by introducing anti-oxidant material. The anti-oxidant material not only minimizes the undesirable changes in the fat, but it also functions to minimize oxidation and adverse color reactions in the lean. The preliminary conditioning with anti-oxidant material is effected at conventional cold temperatures by bathing the pieces in an aqueous bath containing dispersed anti-oxidant material and preferably by immersion therein. The conditioning bath may be used to introduce one or more of various flavoring materials or other agents, such as spices, taste-enhancers, and color-enhancers, or a sugar which in the form of dextrose or other reducing sugar participates in the formation and fixing of desirable color in the lean.

By use of the process of the present invention, there may be attained a bacon having a sweet (meaning non-rancid) fat having less content of free fatty acid in the fat, and one having lean or protein strips of a desirable bright red color which is stable upon exposure to air.

In carrying out our invention, one or more of fresh pork bellies is subjected at any temperature in the range from 38° F. to 42° F. to the action of an aqueous bath containing essentially a suitable dissolved or dispersed anti-oxidant agent for a period in the range from 8 to 12 hours. This preferably takes place in a container wherein each piece rests upon some perforated or open shelf, rack or support, in order to avoid having any untreated or unexposed surfaces in contrast to the conditions where one piece rests on another, and wherein the liquid bath so used is suitably non-stagnant. Under these conditions, each belly or other form of meat being treated is surrounded with this solution to facilitate uniform penetration into it from substantially its entire external surface. This limits the inequality often resulting from stacking one piece upon another as in prior art, after having rubbed it with a curing salt. The cold conditioning step causes the active content of the surrounding bath to penetrate into both the fat and the lean. Although any flavoring material which may be contained in the bath is variable and optional, it is essential for the process that anti-oxidant material be present in this step. Various agents may be used as the anti-oxidant, including nordihydroguairetic acid, ascorbic acid, and its water-soluble salts, and special preparations such as a propylene glycol solution of propyl gallate or butylated hydroxyanisol or both, with or without citric acid, phosphoric acid or other synergistic anti-oxidant acids.

In the conditioning step, by absorption of anti-oxidant material, the lean portion of the bacon develops a bright pink color by change in the pigmentary constituents, the enzymes are retarded in their action, and the fatty acids are inhibited in their normal tendency to become oxidized into the condition generally referred to as rancidity. Not only does the anti-oxidant material function in the cold soaking, but it continues to function in the warm curing step, for which purpose it is specially introduced in accordance with the present invention.

After the conditioning step at the cold temperature above specified, the pork bellies or other forms are then subjected to the action of a curing brine at an elevated temperature. Either the forms are transferred to a different container having suitable perforated or open shelves or screens which hold each form isolated from another, or in the conditioning container the liquid of the conditioning step is withdrawn and the curing brine of more elevated temperature is introduced.

The curing brine employed may be a conventional pickling brine containing sodium chloride and nitrogen-bearing curing salt of alkali metal including essentially alkali metal nitrite, but preferably a mixture of sodium nitrite and sodium nitrate. The nitrite salt is essential for the development and fixation of a bright red color by reaction to form nitroso-hemoglobin. In long-time brine cures, the nitrate salt is reduced to the nitrite salt, which then effects the color; but where the curing time is short, this does not take place, and hence the nitrite salt must be present initially.

In departure from conventional practice, the curing temperature is in the range from 110° F. to 135° F. for a period in the range from 5 to 10 hours, but preferably with the longer period corresponding to the lower temperature, and the shorter period to the higher temperature. Mechanically, the process is effected by agitating or circulating the liquid in the container around the individual pieces, preferably by employing a circulating pump. The resulting movement is preferably such as to assure uniform concentration around all portions of each piece, but importantly it prevents stagnation with resulting depletion of one or more of the salt ingredients locally, thus to avoid adverse results as to the quality and uniformity of cure. Where a circulating pump is employed, it is preferred that the temperature be maintained by adjusting the temperature of the liquid in the conduit from the pump to the vat, by suitable heat exchange apparatus in the circulating system.

In the conventional dry salting method of curing pork bellies with curing salt containing nitrite, it is customary thereafter to expose the cured forms to smoke at a temperature of at least 130° F. for a period of from 5 to 6 hours. While it is well known that the action of the smoke is to add the smoke flavor and a preservative ingredient of smoke, it is also important in the prior art smoking process to elevate the temperature of the bacon at least to 130° F. in order to fix the red color in the lean.

In the process of the present invention, the material from the warm curing step is likewise subjected to the conventional curing action of smoke at any temperature from 110° F. to 135° F. for a period of from 6 to 10 hours. In this invention it is not important to effect temperature control as in the prior art in order to fix the red color, because this will have been done at the temperature of the warm brine curing step. Accordingly, the smoking step can be conducted without regard for exact temperature control to fix the red coloration.

In the conditioning step of the present invention, the flavoring ingredients may be varied over a wide range. For example, we have found that neutralized protein hydrolysate containing or limited to monosodium glutamate is desirable. Monosodium glutamate as the sole amino acid product is commonly used to enhance the flavor of the meat and other food products, and by the present invention it may be advantageously introduced into the bacon itself. When whole protein hydrolysate is employed, it is well known that glutamic acid is one of the constituents and in such a neutralized protein hydrolysate there is formed monosodium glutamate.

Spice seasonings and ground spices or their essential oils and oleoresins may be present in the conditioning bath for absorption by the meat products being treated. Likewise, sugars or syrups may be added, leading to so-called sugar-cured products. Although sugar and other flavoring agents may be present in the curing bath, it is preferred to have them in the conditioning bath because the longer time of immersion is more favorable to uniform absorption.

Suitable conditioning solutions are:

Example 1

| | | |
|---|---|---|
| Water | gallons | 5 |
| Monosodium glutamate | ounces | 1 |
| Ascorbic acid | grams | 18 |
| Dextrose | ounces | 2 |

Example 2

| | | |
|---|---|---|
| Water | gallons | 5 |
| Monosodium glutamate | ounces | 1 |
| Ascorbic acid | grams | 18 |
| Citric acid | do | 18 |
| Corn sugar | ounces | 2 |

Example 3

| | | |
|---|---|---|
| Water | gallons | 5 |
| Neutralized protein hydrolysate [1] | ounces | 2 |
| Propyl gallate | grams | 1.9 |
| Citric acid | do | 7.1 |

[1] A hydrochloric acid hydrolysate of mixed wheat gluten and soy bean flour, neutralized to pH of 5.2. Contains on dry basis 38% of sodium chloride.

Example 4

| | | |
|---|---|---|
| Water | gallons | 5 |
| Monosodium glutamate [1] | ounces | 1 |
| Nordihydroguairetic acid | grams | 1.9 |
| Citric acid | do | 7.1 |

[1] Or substitute twice as much of the protein hydrolysate of Example 3.

Example 5

| | | |
|---|---|---|
| Water | gallons | 5 |
| Monosodium glutamate | ounces | 1 |
| Solution of antioxidant [2] | grams | 7.1 |

[2] Composition by weight:

| | Parts |
|---|---|
| Propylene glycol | 45 |
| Propyl gallate | 27.5 |
| Anhydrous citric acid | 27.5 |

Example 6

| | | |
|---|---|---|
| Water | gallons | 5 |
| Monosodium glutamate | ounces | 1 |
| Antioxidant composition [3] | do | 1 |

[3] Composition by weight:

| | Parts |
|---|---|
| Propylene glycol | 70 |
| Butylated hydroxyanisol | 20 |
| Propyl gallate | 6 |
| Citric acid | 4 |

In the foregoing conditioning baths the function of the antioxidant is enhanced by an acid synergist, preferably citric acid. Citric acid functions as an antioxidant by reason of its power to sequester cations, especially iron and copper which are catalysts to enhance oxidation. By sequestering such ions they lose their catalytic activity. The sequestering of the cations thus renders the organic antioxidants more effective than they are in the presence of unsequestered cations. Hence, in a mixture of organic antioxidants with citric acid or phosphoric acid, and other acids which sequester, the acid is a synergist.

Where the organic antioxidant is propyl gallate, it is highly advantageous to use a sequestering agent for cations of iron. These form dark-blue color, as ferric gallate, a well-known color in writing inks. Formation of such ferric gallate in the process of the present invention leads to bluish coloration in the fat.

The curing brine may also contain flavoring ingredients when it is compatible. Sugar is a conventional agent so used in curing brine, especially for hams and bacon. The following illustrates:

Example 7

| | | |
|---|---|---|
| Water | gallons | 10 |
| Sodium chloride | pounds | 22 |
| Sodium nitrite | ounces | 3.25 |
| Sodium nitrate | do | 2.125 |
| Cane sugar | pounds | 3 |

Example 8

| | | |
|---|---|---|
| Water | gallons | 10 |
| Sodium chloride | pounds | 22 |
| Sodium nitrite | do | 3.25 |
| Cane sugar | do | 3 |

Process Example 9

A 10-pound belly is immersed at 38° F. to 42° F. in any of the foregoing conditioning solutions, for 8 to 12 hours, then in the brine of Examples 7 or 8 for 6 hours at 125° F. Then the belly is placed in a smokehouse at 120° F. to 130° F. for 10 hours, effecting a drying and a smoking action.

The finished product of the present invention is uniformly cured and flavored, with bright red lean. The shrinkage in process from raw or green bellies is roughly 10% or less compared to loss of from 15% to 20% by the prior art dry salting process.

A bacon cured by the present invention using compositions of Examples 1 and 7, shows as follows:

| | | |
|---|---|---|
| Moisture | per cent by weight | 27.10 |
| Sodium chloride | do | 2.34 |
| Nitrite nitrogen as sodium nitrite | do | .0026 |
| Nitrate nitrogen as sodium nitrate | do | .0032 |
| Peroxide number | | 0.5 to 1.5 |

In a bacon slab having a lean strip A at the surface and a lean strip B between two layers of fat, the salt analysis shows:

| | Per Cent Sodium Chloride | Sodium Nitrite in Parts per Million |
|---|---|---|
| Strip A | 3.36 | 29 |
| Strip B | 3.05 | 24 |
| Whole Slab | 1.71 | 26 |

The character as to taste, flavor and stability of bacon are matters not subject to precise analysis, and are best judged by those trained for such testing. The matter of color is apparent to the consumer, who buys by appearance, and the stability of color is a matter of importance to the merchant. The merchant displays packaged slices exhibiting the colored lean, and if the red color does not last while on display, the product is not satisfactory to the merchant. The present process offers lasting color and taste in the merchant's hands and attractive color to the buyer, who finds also a sweet and clean bacon free from rancid and off-flavor taste.

It is to be understood that the examples are given merely to illustrate the invention and that numerous changes and modifications in the two baths and in the processing are contemplated as falling within the scope of the appended claims.

We claim:

1. The method of curing pork bellies and similar animal body pieces which comprises subjecting substantially the entire surface of such pieces at any temperature in the range from 38° F. to 42° F. to the action of an aqueous bath containing dissolved antioxidant material for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

2. The method of curing pork bellies and similar animal body pieces which comprises subjecting substantially the entire surface of such pieces at any temperature in the range from 38° F. to 42° F. to the action of an aqueous bath containing flavoring material and dissolved antioxidant material for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

3. The method of curing pork bellies and similar animal body pieces which comprises subjecting substantially the entire surface of such pieces at any temperature in the range from 38° F. to 42° F. to the action of an aqueous bath containing dissolved cation-sequestering synergistic antioxidant composition for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

4. The method of curing pork bellies and similar animal body pieces which comprises subjecting substantially the entire surface of one such pieces at any temperature in the range from 38° F. to 42° F. to the action of an aqueous bath containing dissolved non-sequestering antioxidant material and citric acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

5. The method of curing pork bellies and similar animal body pieces which comprises subjecting substantially the entire surface of such pieces at any temperature in the range from 38° F. to 42° F. to the action of an aqueous bath containing flavoring material and dissolved cation-sequestering synergistic antioxidant composition for a period in the range from eight to twelve hours, then surrounding each piece with a moving curing brine containing essentially sodium chloride and nitrogen-bearing curing salt of alkali metal and including essentially alkali metal nitrite at any room temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

6. The method of curing pork bellies and similar animal body pieces which comprises subjecting substantially the entire surface of such pieces at any temperature in the range from 38° F. to 42° F. to the action of an aqueous bath containing flavoring material and dissolved non-sequestering antioxidant material and citric acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

7. The method of curing pork bellies and similar animal body pieces which comprises subjecting substantially the entire surface of such pieces at any temperature in the range from 38° F. to 42° F. to the action of an aqueous bath containing reducing sugar and dissolved cation-sequestering synergistic antioxidant composition for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

8. The method of curing pork bellies and similar animal body pieces which comprises subjecting substantially the entire surface of such pieces at any temperature in the range from 38° F. to 42° F. to the action of an aqueous bath containing reducing sugar and dissolved non-sequestering antioxidant material and citric acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

9. The method of curing pork bellies and similar animal body pieces which comprises subjecting substantially the entire surface of such pieces at any temperature in the range from 38° F. to 42° F. to the action of an aqueous bath containing in solution antioxidant material selected from the group consisting of ascorbic acid and its water-soluble salts for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

10. The method of curing pork bellies and similar animal body pieces which comprises subjecting substantially the entire surface of such pieces at any temperature in the range from 38° F. to 42° F. to the action of an aqueous bath containing in solution antioxidant material selected from the group consisting of ascorbic acid and its water-soluble salts and dissolved cation-sequestering acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

11. The method of curing pork bellies and similar animal body pieces which comprises subjecting substantially the entire surface of such pieces at any temperature in the range from 38° F. to 42° F. to the action of an aqueous bath containing in solution antioxidant material selected from the group consisting of ascorbic acid and its water-soluble salts and citric acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

12. The method of curing pork bellies and similar animal body pieces which comprises subjecting substantially the entire surface of such pieces at any temperature in the range from 38° F. to 42° F. to the action of an aqueous bath containing flavoring material and containing in solution antioxidant material selected from the group consisting of ascorbic acid and its water-soluble salts for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

13. The method of curing pork bellies and similar animal body pieces which comprises subjecting substantially the entire surface of such pieces at any temperature in the range from 38° F. to 42° F. to the action of an aqueous bath containing flavoring material and containing in solution antioxidant material selected from the group consisting of ascorbic acid and its water-soluble salts and dissolved cation-sequestering acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured pieces to the drying and treating action of meat-curing smoke at any temperature in the range from 110° F. to 135° F. for a period in the range from six to ten hours.

14. The method of curing pork bellies and similar animal body pieces which comprises subjecting substantially the entire surface of such pieces at any temperature in the range from 38° F. to 42° F. to the action of an aqueous bath containing flavoring material and containing in solution antioxidant material selected from the group consisting of ascorbic acid and its water-soluble salts and citric acid for a period in the range from eight to twelve hours, then surrounding each piece with a moving curing brine containing essentially sodium chloride and nitrogen-bearing curing salt of alkali metal and including essentially alkali metal nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

15. The method of curing pork bellies and similar animal body pieces which comprises subjecting substantially the entire surface of such pieces at any temperature in the range from 38° F. to 42° F. to the action of an aqueous bath containing flavoring material and in solution antioxidant material selected from the group consisting of ascorbic acid and its water-soluble salts for a period in the range from eight to twelve hours, then surrounding each piece with a moving curing brine containing essentially sodium chloride, sodium nitrate and sodium nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

16. The method of curing pork bellies and similar animal body pieces which comprises subjecting substantially the entire surface of such pieces at any temperature in the range from 38° F. to 42° F. to the action of an aqueous bath containing flavoring material and in solution antioxidant material selected from the group consisting of ascorbic acid and its water-soluble salts and dissolved cation-sequestering acids for a period in the range from eight to twelve hours, then surrounding each piece with a moving curing brine containing essentially sodium chloride, sodium nitrite and sodium nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

17. The method of curing pork bellies and similar animal body pieces which comprises subjecting substantially the entire surface of such pieces at any temperature in the range from 38° F. to 42° F. to the action of an aqueous bath containing flavoring material and in solution antioxidant material selected from the group consisting of ascorbic acid and its water-soluble salts and citric acid for a period in the range from eight to twelve hours, then surrounding each piece with a moving curing brine containing essentially sodium chloride, sodium nitrate and sodium nitrite at any temperature in the range from 110° F. to 135° F. for a period in the range from five to ten hours, and then subjecting a resulting brine-cured piece to the drying and treating action of meat-curing smoke at any temperature in the range from 110° F. to 135° F. for a period in the range from six to ten hours.

STEPHAN L. KOMARIK.
LLOYD A. HALL.

REFERENCES CITED

The following references are of record in the file of this patent:

UNITED STATES PATENTS

| Number | Name | Date |
|---|---|---|
| 2,173,992 | Allen | Sept. 26, 1939 |
| 2,176,144 | Moskowitz et al. | Oct. 17, 1939 |
| 2,491,646 | Coleman et al. | Dec. 20, 1949 |
| 2,528,204 | Zwosta | Oct. 31, 1950 |